UNITED STATES PATENT OFFICE.

ANDREW THOMA, OF CAMBRIDGE, MASSACHUSETTS, ASSIGNOR TO THOMA CORPORATION, OF PORTLAND, MAINE.

PACKAGE OF STICKY CEMENT AND METHOD OF MAKING THE SAME.

No. 931,350.  Specification of Letters Patent.  Patented Aug. 17, 1909.

Application filed May 6, 1908. Serial No. 431,246.

*To all whom it may concern:*

Be it known that I, ANDREW THOMA, a citizen of the United States, and resident of Cambridge, in the county of Middlesex and State of Massachusetts, have invented an Improvement in Packages of Sticky Cement and Methods of Making the Same, of which the following description, in connection with the accompanying drawings, is a specification.

My present invention has for its object the accomplishment of the parceling of a cement such as described in my Patent No. 855,868, so as to produce a package having the various packaging advantages explained in my Patent No. 862,360.

To meet the present-day conditions prevailing in shoe factories, I aim to provide a package of cement which shall be self-sustaining so that it may be kept exposed in quantity ready either for future or instant use without suffering deterioration in quality or being encumbered by its envelop when put to use. Also, as a cement of the kind in question is exceedingly tacky and sticky, and hence cannot be handled conveniently either with the hands or otherwise, my invention provides means whereby this tenaciously sticky substance may be handled in package form with impunity.

In carrying out my invention I provide the cement with a coating surface preferably of soapy-like substance which temporarily neutralizes or offsets the native stickiness of the cement so that the mass may be readily grasped by the hand without any danger of having the latter contaminated by the sticky cement notwithstanding the slight heating effect of the warm hand.

My invention includes the provision of a surface coating on the mass or package of cement which may be readily dissolved or spread over the surface of the cement by water or other readily available solvent so as to form during the necessary momentary handling of the cement an intervening film-like coating between the hand and the cement itself, and which coating either washes off or becomes incorporated into the cement without injury to the latter as the latter is melted for use.

In its more complete embodiment, my invention embraces within its scope also the provision broadly of a jacket or wrapper having a film-like coating or lining of matter soluble as above stated but normally dry or approximately dry, said film-like coating separating the wrapper proper from the cement, and normally forming as well a binding medium maintaining the wrapper in place as a practical envelop to maintain the cement in package form. I consider the provision of this soluble coating or covering as new, irrespective of whether it produces a slimy or saponaceous effect in solution or not.

My invention is not limited to cement.

I have succeeded in providing an enveloping wrapper which greatly facilitates the parceling or packaging of this exceedingly sticky material which is otherwise so difficult to manage, and yet, my wrapper being of such a nature that its use does not interfere in any way with the ordinary factory requirements, but is exceedingly simple and expeditious and facilitates the use of the cement, rather than hindering said use. I take sheets or rolls of ordinary wrapping paper, preferably of a very porous nature, thin and rather tender, and spread upon one side of the same a thick coating of liquefied soap. Common ordinary soap scrap may be used for the base, treated in boiling water to a thick solution which when applied to the paper still in its heated condition allows itself to spread readily upon the surface of the paper, and then upon cooling and drying forms a perfect overlaying film. The wrapping paper thus treated is cut into the required shape to be formed into paper bags of convenient size to receive the cement. These bags may be held by any suitable means, as by a frame or rack like pigeon-holes, from which the open-mouthed bags protrude in desired numbers. Into these bags or molds the cement is poured hot and permitted to cool, whereupon the mouths of the bags are folded down, and the package is complete. It will be understood that the coated side of the paper forms the inner side of the bag. The soap itself is sufficient to stick the sheets together in bag form when properly folded, and hence there is no foreign substance between the paper and the cement excepting solely the saponaceous layer. By saponaceous layer I do not intend to restrict myself technically to soap, but intend to include all substances and compounds capable of providing a slippery, readily soluble coating or surface for the purpose which I will now further describe. The comparatively thick, sluggishly flowing cement sets rather quickly so that it is stiff enough to stand alone. Thus enveloped my cement may be kept in a convenient place in the factory handy to the operator who, when about ready to use it, places one or more bars or packages into a pail of water (or other solvent according to the nature of the coating used) to soak the wrapper for a few minutes. Upon withdrawing the cement parcel from the bath of solvent, it will be found that the softened soap will allow the prompt removal of the paper envelop, leaving the bar or package of clear cement covered with a slimy coating permitting it to be handled readily without its sticking to the hands. The slimy condition of the soap prevents for the moment its adhesion to the hand.

I prefer to use commercial soap as the base of my coating, but I have found it advantageous to add to it a small amount of mucilage or mucilaginous matter to increase its adhesiveness, thereby facilitating the making of the bags and packaging of the same. As already stated, however, I do not limit my invention in all cases to the provision of a saponaceous or slimy coating, but intend to include any barrier between the outside fabric covering (preferably paper) capable of disintegrating or becoming solvent when subjected to a bath of solvent non-injurious to the cement. A barrier capable of becoming slimy is preferable, because it more readily prevents the cement sticking to the fingers, and enables the operator to handle the cement with more impunity than when the barrier or coating is not of a slippery character and wet. I also wish it understood that the principle contained in my present invention can be attained in various ways.

The soapy or slimy coating is preferably soap with a surplus of alkali (or other well known agent rendering it specially soluble in a wet bath), paste (or any equivalent mucilaginous matter), silicates of soda or potash, or any other substance readily soluble in water, but also includes substances soluble in other chemicals or treated liquids, as resinates, casein, caseinates, etc. which are soluble in alkali, lime compounded with glue or other binders, soluble in alkaline water, and various acids, such as tartaric acid (which may take the place of the alkali in the coating or in the bath). The range is exceedingly broad, and I intend to include having the dissolving agent either present in the coating itself or in the liquid bath or in both. To give a greater body to the coating, especially when liquid soap is employed, I add to it soapstone, or talc, etc. I have found also an addition of farinaceous matter, such as flour, starch, or dextrin will not only increase the consistency of the coating but also change its nature so that it makes a better binding agent for the seams of the paper parcel.

Likewise the addition of mucilaginous gums or well known combinations of fish glue or other gelatinous matter may be used.

When the soapy solution is used as the barrier between the paper and the cement bar, and the paper is of a porous, thin, weak texture, it will be found that when the package is submerged in water for a few moments, it is possible to make the outside paper covering slough off more or less like pulp, and whenever tougher paper or other fabric is employed for the outside envelop it usually peels off as a sheet.

A further feature of my invention relates to cements or similar masses capable of assuming package shape and remaining for a time more or less sticky, in which case, after the mass has been shaped, as for example by my process above set forth, the supporting wrapper is removed leaving the block of cement intact and set whereupon a non-sticky coating is applied, of material which is readily removable or is not objectionable to becoming subsequently incorporated into and used with the cement when the latter is softened and applied. For instance a light coating of farinaceous paste, or of pulverized talc, may be used, or a thin skin of gelatin or any other non-sticky substance capable of melting down or disappearing when the cement is melted, or capable of being washed off before the cement is used. In other words, this feature of my invention includes the provision of a separating coating or of a non-sticky surface between adjacent packages of the cement, capable of entire removal from the cement package without injury thereto or of becoming incorporated in the cement without injury thereto.

While my invention is primarily intended for cement, and more particularly for cement of the character first mentioned, it will be understood that I am not limited in this respect, as my invention is advantageous for packing other materials difficult to handle and to free from ordinary inclosure.

Having described my invention, what I claim as new, and desire to secure by Letters Patent, is:

1. A package of normally substantially solid sticky cement, rendered externally non-sticky and handable and packable by having an external thin readily soluble coating capable of becoming slimy when softened.

2. A package of normally substantially solid material, having a thin readily soluble soapy coating.

3. A package of normally substantially solid material, combined with an enveloping fabric wrapper, and an intervening thin barrier temporarily uniting the two and readily soluble for permitting the quick separation of the wrapper from its contents.

4. A cement package, consisting of a body of cement of substantially self-sustaining consistency and normally apt to stick to adjacent objects, provided with means to prevent said sticking, including an exterior coating of normally substantially dry material capable of becoming quickly slimy in the presence of a solvent.

5. A cement package, consisting of a body of cement of substantially self-sustaining consistency, and normally apt to stick to adjacent objects, provided with means to prevent said sticking, including an exterior coating of normally substantially dry material capable of becoming quickly slimy in the presence of water.

6. A cement package, consisting of a body of normally substantially solid cement, provided with a thin coating of soapy material.

7. A cement package, consisting of a body of cement enveloped with a fabric wrapper united to said cement by an intervening barrier readily soluble without disturbing the cement.

8. A cement package, consisting of a body of cement enveloped with a fabric wrapper united to said cement by an intervening barrier readily soluble in water without disturbing the cement.

9. A cement package, consisting of a body of cement enveloped with a fabric wrapper united to said cement by an intervening barrier of soapy material.

10. A cement package, consisting of a body of cement enveloped with porous paper united to said cement by an intervening barrier of soapy material.

11. A package of substantially self-sustaining sticky cement, having a non-sticky, soluble outer layer, rendering the package capable of being readily handled.

12. A cement package, consisting of a substantially self-sustaining body of sticky cement, having a non-sticky outer surface protector capable of being eliminated as such from the cement without injury to the latter.

13. A cement package, consisting of a substantially self-sustaining body of sticky cement, having a non-sticky outer surface coating acting to protect the package from sticking to adjacent packages or objects, and capable of entering into and passing along with the cement in use without materially interfering with the efficiency of the cement.

14. The method, consisting of providing a package-forming mold with a readily soluble coating capable of being subsequently dissolved without interfering with the cement package, and then introducing liquid cement and permitting the same to set into substantially self-sustaining package-form.

15. The method, consisting of providing a package-forming mold with a readily soluble coating capable of being subsequently dissolved without interfering with the cement package, then introducing liquid cement and permitting the same to set into substantially self-sustaining package-form, and then separating the mold from the package by dissolving the intervening soluble coating, thereby leaving the block of cement intact in package form.

16. The method, consisting of providing a package-forming mold with a readily soluble coating capable of being subsequently dissolved without interfering with the cement package, then introducing liquid cement and permitting the same to set into substantially self-sustaining package-form, then separating the mold from the package by dissolving the intervening soluble coating, thereby leaving the block of cement intact in package form, and finally covering said block of cement with a light coating of non-sticky material.

17. The method, consisting of providing a package-forming mold with a readily soluble coating capable of being subsequently dissolved without interfering with the cement package, then introducing liquid cement and permitting the same to set into substantially self-sustaining package-form, then separating the mold from the package by dissolving the intervening soluble coating, thereby leaving the block of cement intact in package form, and finally covering said block of cement with a light coating of non-sticky material having such substance and condition as to be capable of entering into and passing along with the cement in use without materially interfering with the efficiency of the cement.

In testimony whereof, I have signed my name to this specification, in the presence of two subscribing witnesses.

ANDREW THOMA.

Witnesses:
  M. J. SPALDING,
  EDWARD MAXWELL.